March 30, 1965 W. W. BUNTING, JR., ET AL 3,175,290
YARN HANDLING APPARATUS
Filed Aug. 22, 1962 7 Sheets-Sheet 1

INVENTORS
WILLIAM WALLAR BUNTING, JR.
ROBERT MEAGHER
KENNETH GILBERT SWAYNE
JOHN PALMER WORK
BY
Harry E. Braddock
ATTORNEY INVENTORS
WILLIAM WALLAR BUNTING, JR.
ROBERT MEAGHER
KENNETH GILBERT SWAYNE
JOHN PALMER WORK

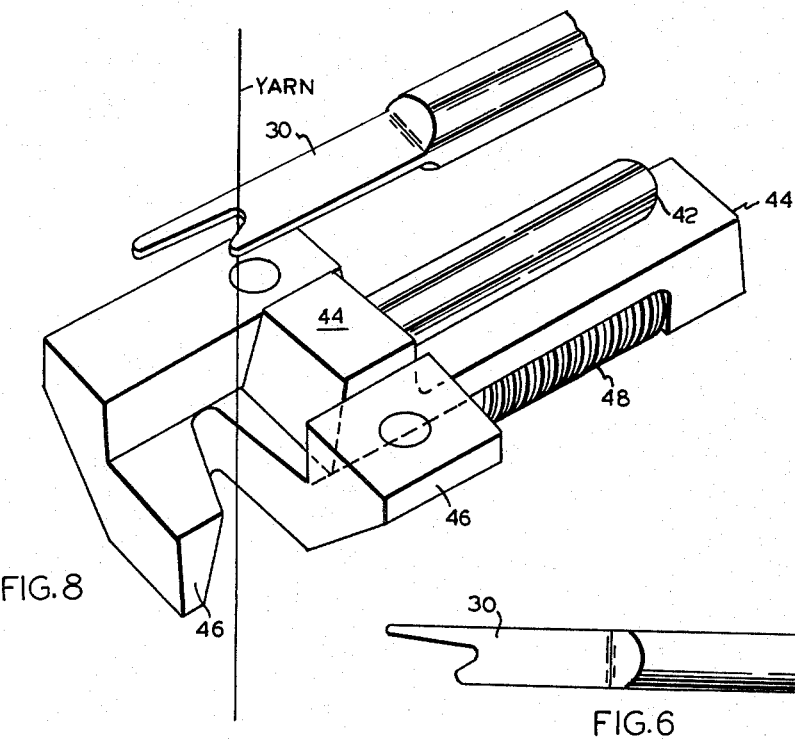
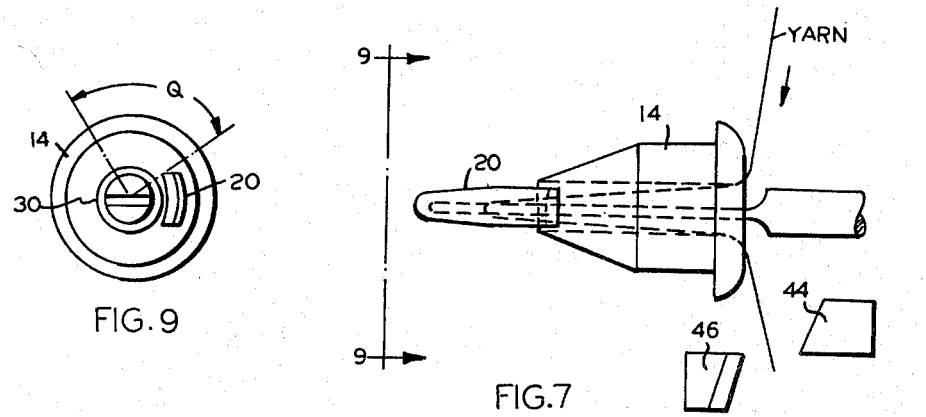

March 30, 1965 W. W. BUNTING, JR., ET AL 3,175,290
YARN HANDLING APPARATUS
Filed Aug. 22, 1962 7 Sheets-Sheet 5

INVENTORS
WILLIAM WALLAR BUNTING, JR.
ROBERT MEAGHER
KENNETH GILBERT SWAYNE
JOHN PALMER WORK
BY Harry E. Braddock
ATTORNEY March 30, 1965   W. W. BUNTING, JR., ETAL   3,175,290
YARN HANDLING APPARATUS
Filed Aug. 22, 1962   7 Sheets-Sheet 6

INVENTORS
WILLIAM WALLAR BUNTING, JR.
ROBERT MEAGHER
KENNETH GILBERT SWAYNE
JOHN PALMER WORK
BY *Harry C. Braddock*
ATTORNEY

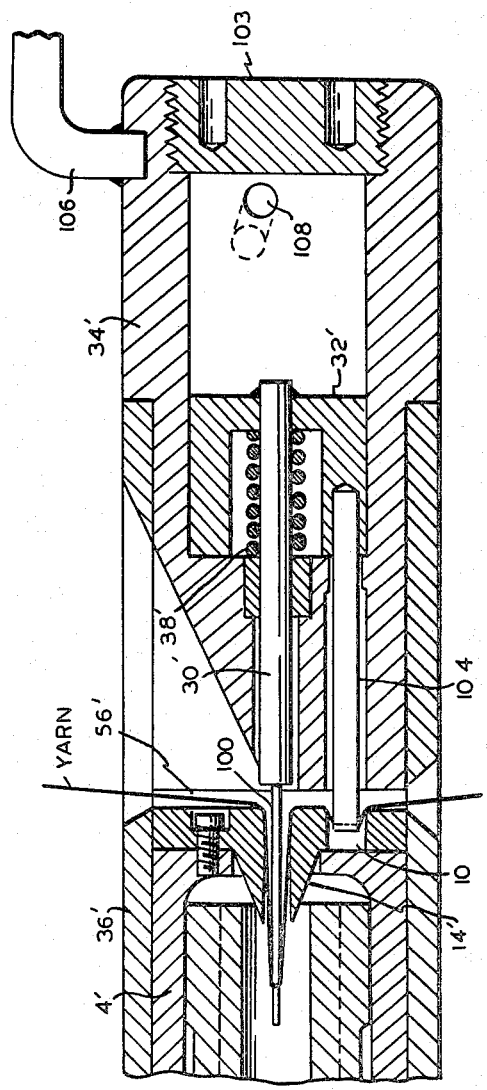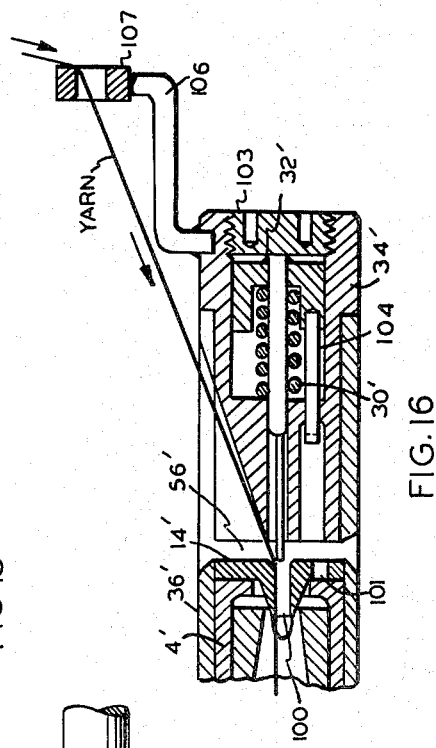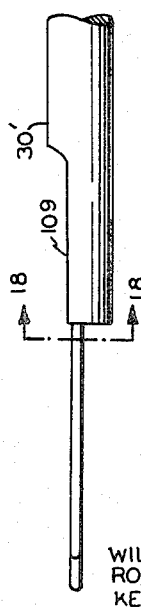

United States Patent Office 3,175,290
Patented Mar. 30, 1965

3,175,290
YARN HANDLING APPARATUS
William Wallar Bunting, Jr., Wilmington, Del., Robert Meagher, Wallingford, Pa., Kenneth Gilbert Swayne, Hockessin, Del., and John Palmer Work, Horsham, Pa., assignors to E. I. du Pont de Nemours and Company, Wilmington, Del., a corporation of Delaware
Filed Aug. 22, 1962, Ser. No. 218,716
7 Claims. (Cl. 30—228)

This invention generally relates to the field of yarn-handling devices and, in particular, to a portable device capable of rapidly picking up a high speed running length of yarn and maintaining the yarn under sufficient tension until it has been transferred to a yarn take-up or winding device.

In handling threads of either natural or synthetic origin, it is frequently desirable that the thread be collected temporarily by an auxiliary device rather than by the regular collecting apparatus. For example, U.S. Patent 2,667,964 to Miller describes such a conventional yarn-handling device. This invention is considered to be an improvement in devices of the Miller type.

In the processing of synthetic threads, it is quite important in many operations that adequate tension be maintained at all times, even when transferring the yarn from one collection point to another such as when doffing; it is also important that yarn tension should not be permitted to remain at a reduced level for a long period of time, but tension drops of extremely short duration may be acceptable. When a device similar to the Miller patent, first engages a running length of yarn, it picks up the yarn by generation of sufficient suction. Due to the nature of such devices this necessarily means that the tension that can be applied to the yarn at the time of yarn pickup is appreciably reduced; frequently reaching zero tension for appreciable periods of time. However, when the yarn has been engaged and is moving into the device, tension can then be increased, by an adjustment, to the desired level to maintain the necessary yarn velocity. However, in many fast-running processes, i.e., where the yarn is running at very high speeds, this momentary decrease in tension during yarn pickup is sufficient to cause serious problems including yarn break-down in the upstream processing equipment.

It is an object of this invention to provide an improved, efficient yarn-handling device capable of picking up a high-speed running length of yarn very rapidly while maintaining adequate yarn tension during the cut and pickup periods and during the subsequent transfer of the running end of yarn to a windup or other device.

Another object is the provision of an improved yarn-handling device which can handle efficiently and reliably yarns moving at extremely high speeds without the need for the conventional adjustment from high suction-low tension to the low suction-high tension condition of operations.

Another object is the achievement of successive or simultaneous pickup and handling of a plurality of high-speed running threadlines such that the threadlines may be successively or simultaneously strung to one or more winding devices or other devices.

It is a further object of this invention to provide an improved yarn-handling device which is simple in construction, easy to produce and maintain, yet efficient in operation.

Other objects will become apparent from the description hereinafter.

The aforementioned objects are accomplished by the provision of a novel, improved, portable yarn-handling device comprising in combination an air inlet tube; a yarn inlet tube; an air outlet tube; a passageway connecting the air inlet tube to the air outlet tube; the yarn inlet tube and the air outlet tube positioned to form an annular orifice; means to rapidly physically move the running yarn into and through the yarn inlet tube; and means for severing or breaking the yarn line; yarn inlet tube and the air outlet tube forming the passageway for the yarn through the device. In addition, the configuration of the annular orifice and the outlet tube are such that air flow conditions are produced which insure maximum tension on the yarn.

Other objects and advantages will appear from a consideration of the specification, the claims and the accompanying drawings in which:

FIGURE 6 is a plan view of the tip of a push-rod taken along line 6—6 of FIGURE 2;

FIGURE 7 is a partial cross-sectional view of the yarn inlet tube, the push-rod, and the yarn after the push-rod has moved the yarn beyond the downstream end of the yarn inlet tube but before the yarn has been cut or broken;

FIGURE 8 is an isometric view of the yarn cutter portion of the yarn-handling device of FIGURES 1 and 2;

FIGURE 9 is an end view of the yarn inlet tube assembly taken from line 9—9 of FIGURE 7;

FIGURE 15 is a partial longitudinal cross-sectional view similar to FIGURE 11 except that the push-rod assembly is shown at the end of its working stroke, and a yarn line is shown;

FIGURE 16 is a partial longitudinal cross-sectional view similar to FIGURE 15 except that the yarn line is shown after break-down preparatory to string-up of a windup apparatus or the like;

FIGURE 17 shows a side elevation of a modified push-rod having its normal top side cut away; and FIGURE 18 is a transverse cross-sectional view of the push-rod of FIGURE 17 taken at line 18—18 of FIGURE 17.

Figure 1:
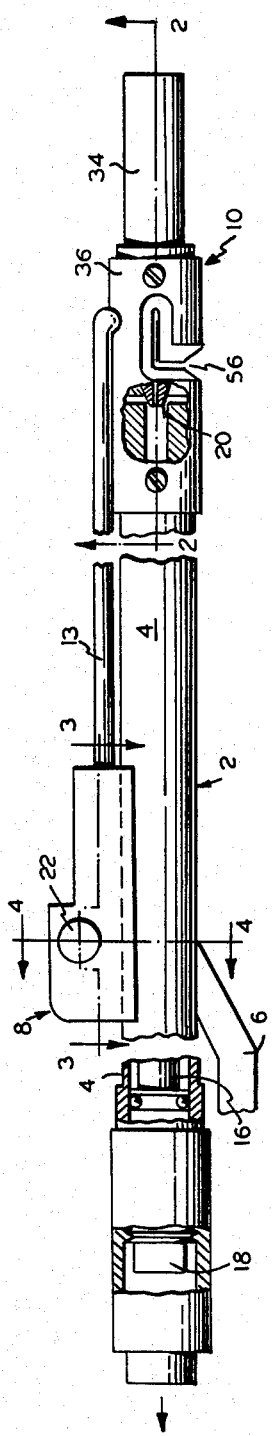
FIGURE 1 is a side elevational view of the improved device of this invention with certain parts broken away and shown partially in section.
Figure 2:
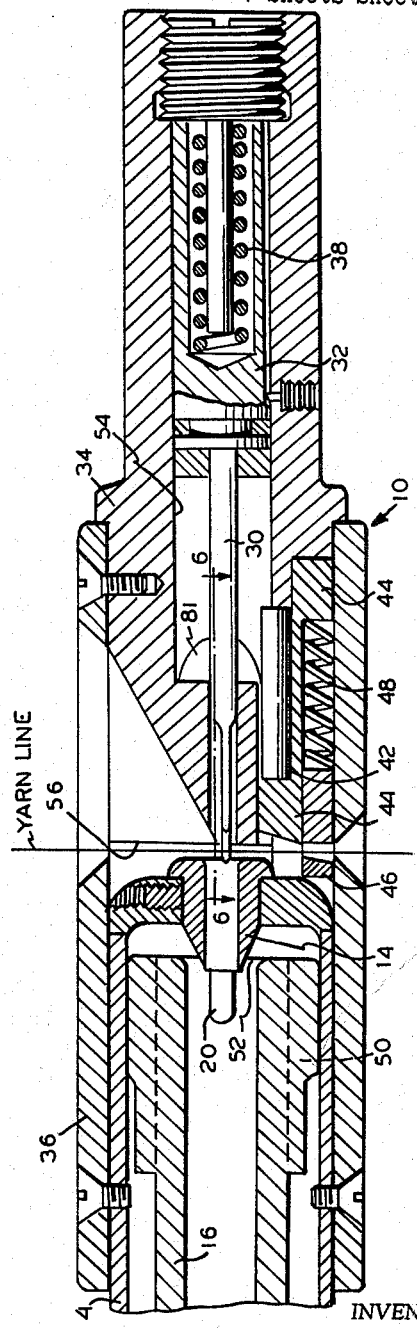
FIGURE 2 is a partial longitudinal cross-sectional view taken at line 2—2 of FIGURE 1.

The portable yarn-handling device 2 shown in FIGURES 1 and 2 comprises an air inlet tube 4 which forms the main body of the device. Mounted externally on tube 4 is the air supply tube 6 which is connected to tube 4, valve assembly 8, and push-rod assembly or yarn line manipulating unit 10. Conduit tube 13 transmits air from the interior of tube 4 and the valve assembly 8 to the push-rod assembly 10. At the inlet end of tube 4 is secured, by suitable means, yarn inlet tube 14. Mounted inside inlet tube 4 is outlet tube 16. The position of the outlet tube 16 with respect to inlet tube 14 is adjusted by the threaded mounting and lock-bushing 18. A projecting elongated tab element 20 is mounted on the end of the yarn inlet tube 14 and extends into annular orifice 52 formed between the inlet end of the outlet tube 16 and the tapered outer section of the end of the yarn inlet tube 14. This tab element may be secured to yarn inlet tube 14 as shown. Element 20 serves to increase the tension which may be exerted on the yarn by reason of the high degree of agitation, a turbulence that is induced in the fluid stream by the tab element; this is particularly true when handling highly coherent multifilament yarns, especially when wet or coated with finish or the like.

Figure 3:
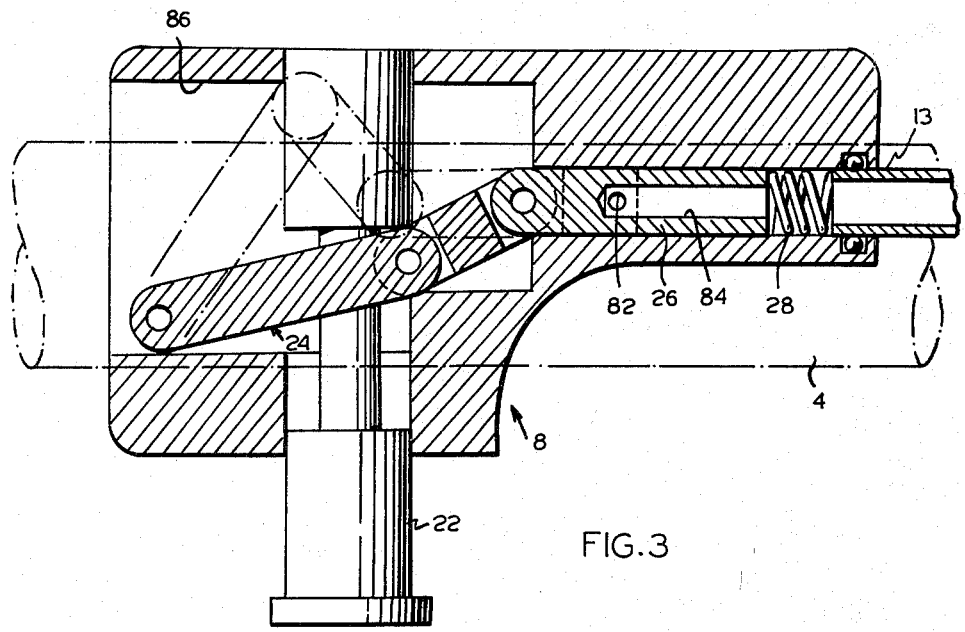
FIGURE 3 is a partial longitudinal cross-sectional view taken at line 3—3 of FIGURE 1.

Valve assembly 8 comprises push button 22, linkage 24, and valve 26 which is biased by spring 28. This assembly selectively controls the flow of air in inlet tube 4 to the push-rod assembly. The valve 26 is provided with an axial passage 84 which intersects a radial valve passage 82. When the valve 26 is in the position shown in FIGURE 3, the radial valve passage 82 is in alignment with a radial passage 80 (shown in FIGURE 4) in the air inlet tube 4; when the linkage 24 is moved to the position shown by the broken lines, the radial valve passage 82 communicates with the atmosphere through the open portion 86 in valve assembly 8. Tube 13 is coaxial with the bore of valve assembly 8 and abuts the end of spring 28; the tube 13 is sealed to the body of the valve 8 by means of an O ring.

Push-rod assembly or yarn line manipulating unit 10 comprises push-rod 30 mounted on piston 32 which slides in tubular housing 34; the tip of the push-rod, as shown in FIGURE 6, is bifurcated. Housing 34 is attached to air inlet tube 4 by bushing 36. Piston 32 is biased toward the yarn inlet tube by spring 38. Also mounted in housing 34 and bushing 36 is a cutter assembly, shown in FIGURE 8, which comprises slidable push-pin 42, movable knife element 44, stationary knife element 46, and movable knife element biasing spring 48.

Figure 4:
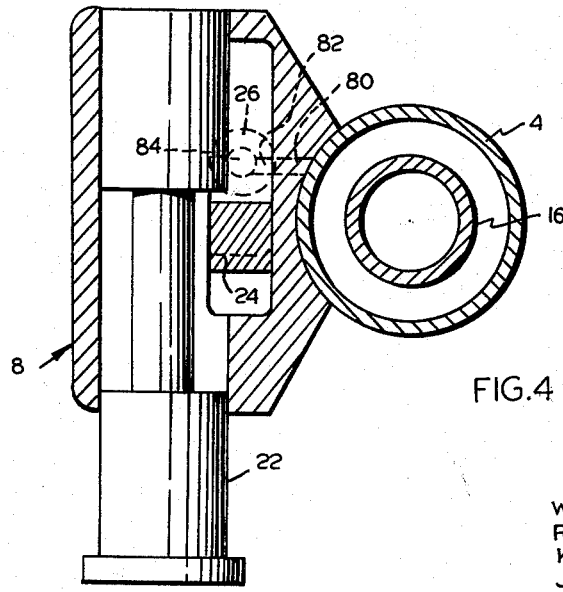
FIGURE 4 is a transverse cross-sectional view taken at line 4—4 of FIGURE 1.

In operation, the operator positions the yarn-handling tool 2 such that moving yarn line is inserted into opening or gap 56 and run therethrough. Compressed air at elevated pressure is supplied through tube 6 and fills the annular space between the interior of air inlet tube 4 and the exterior of outlet tube 16 and flows through the ribbed section 50 of outlet tube 16 through the annular orifice 52 created between the bore of outlet tube 16 and the tapered outer section of the yarn inlet tube 14 and thence down the bore of outlet tube 16. High pressure air is also brought to valve element 26 through radial passage 80 in air inlet tube 4 (FIGURE 4). In addition, a slight outward flow of air exists through yarn inlet tube 14. Outlet tube 16 is so positioned by means of a threaded connection and locked with lock-bushing 18 that annular orifice 52, together with outlet tube 16, create and maintain air flow conditions which cause maximum tension on the moving threadline through the device 2. Normally, valve 26 is positioned so that the air pressure is supplied through radial passage 80, radial valve passage 82, axial valve passage 84 and thence through tube 13 and opening 81 into the space 54 in tubular housing 34 and acts against piston 32 forcing it to the open position and compressing spring 38. When push button 22 is depressed, linkage 24 operates valve 26 and connects space 54 to the atmosphere, thus suddenly releasing the air pressure therein. Spring 38 rapidly moves push-rod 30 to the left shifting the hooked end of the rod from its initial position adjacent the opening 56 in bushing 36 to a second position beyond the inner end of the yarn inlet tube preferably before the yarn is cut. Return of the push button linkage to its initial position causes air pressure to build up again in space 54 to return the push-rod and piston to their starting or "loaded" positions. In the preferred embodiment of this invention the yarn is guided to pass through the quadrant Q (FIGURE 9) adjacent the edge of the tab element that is more or less parallel to the centerline of the device. A running yarn line entering the device should be free of the push-rod. The tang of the push-rod is preferably off the centerline of the device.

After positioning the running threadline in gap 56, the operator then depresses push button 22 and as previously described, the release of the air pressure on piston 32 enables spring 38 to move push-rod 30 so that within a fraction of a second, the push-rod 30 thrusts the moving yarn into and completely through the bore of yarn inlet tube 14 such that the end of push-rod 30 is situated in the region of the high velocity fluid stream as shown in FIGURE 7; the portion of the yarn which extends around the tip of the push-rod is likewise exposed to the high velocity fluid stream about the time the yarn is cut; the amount of exposure of the yarn is ¼ inch or more. Near the end of the stroke of the push-rod, piston 32 contacts slidable pin 42 which in turn drives the movable blade element 44 across stationary blade 46, to sever the yarn line. Since the yarn line is now cut and being supplied from a continuous source, the yarn continues to move through the device 2 without a detrimental loss of tension. Since the annular orifice 52 is adjusted to a high yarn tension condition, the yarn has this tension applied to it almost instantaneously. Therefore, if a drop in yarn tension occurs, tension recovery will be rapid, occurring in a fraction of a second. This is a great improvement over previous yarn-handling devices, particularly those requiring two positions, one of minimum tension-maximum secondary air velocity for initial string-up and a second position of maximum tension-minimum suction for yarn handling.

In the preferred embodiment of this invention the annular orifice is so constructed and arranged, and the outlet tube is of such a configuration that supersonic air flow may be established in the vicinity of the orifice and extremely high air velocity is maintained substantially throughout the outlet tube. Beyond the orifice, outlet tube 16 is of substantially constant cross section, preferably slightly divergent and generally conical in shape wherein the cone included angle may be about fifteen minutes to one degree but preferably is in the range of fifteen to forty-five minutes.

Figure 5A:
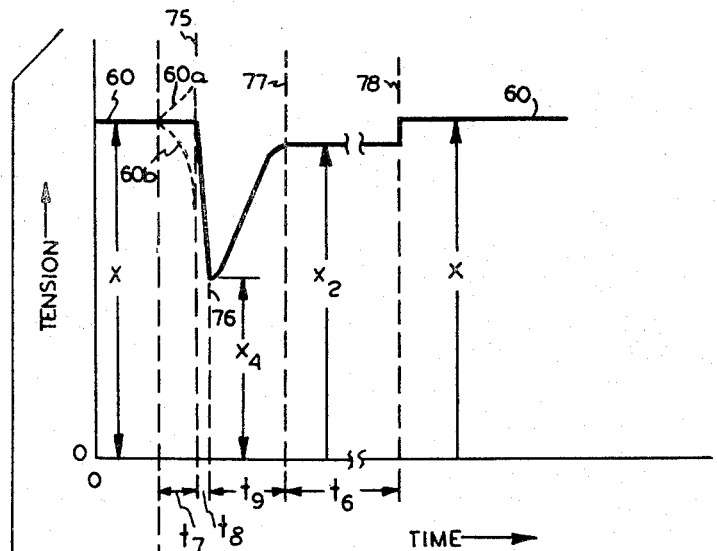
FIGURE 5 is a graphical representation of the variation in yarn tension vs. time for two types of yarn-handling devices, one conventional and one embodying features of the present invention.
Figure 5B:
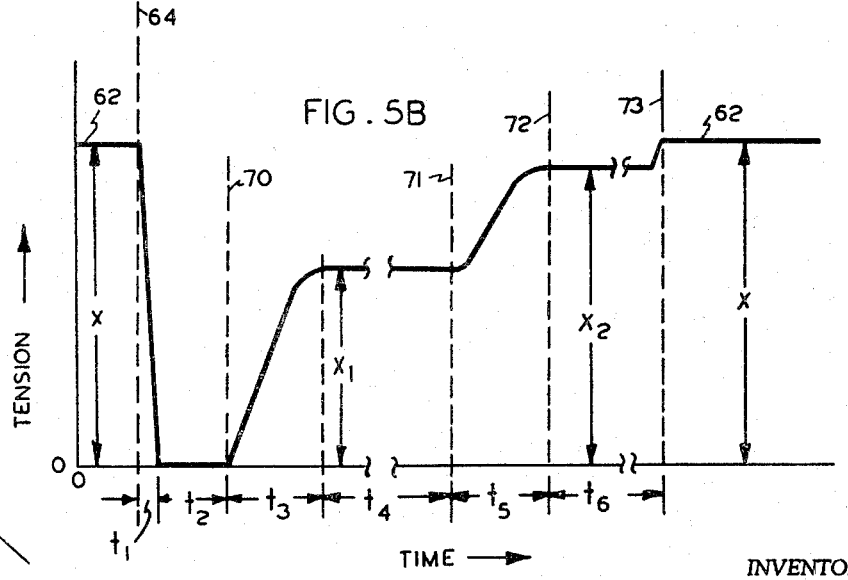

FIGURE 5 shows a comparative graphical representation of yarn tension versus time; FIGURE 5A, curve 60, showing yarn tension versus time for the one-position device of this invention and FIGURE 5B, curve 62, showing yarn tension versus time for a two-position prior art device such as Miller Patent 2,667,964. At zero time, both devices are ready for acting upon a running yarn line and, for purposes of this discussion, it is assumed that the "process" tension X in the undisturbed running yarn line is identical for both cases since this "process" tension X derives from the means for advancing the yarn line (not shown) which means is (at this stage of operations) wholly independent of the two yarn-handling devices. At some time after time zero the yarn-handling devices are manually brought into appropriate position in respect to the running yarn line and, at the time indicated by line 64, string-up of the yarn into either device is undertaken by the operator; from this time onward the behavior and characteristics of the two devices is quite different and hence each will be described separately.

Consider first the prior art device FIGURE 5B, curve 62. The operator manually sets the device for maximum suction then, at time 64, he cuts the running yarn at a point slightly downstream of the device whereupon tension in the yarn line drops extremely abruptly (time period $t_1$) to substantially zero, remaining at zero for a finite time period $t_2$ which generally amounts to about 10 to 20 milliseconds but may range up to 300 milliseconds; during this time period $t_2$, suction in the secondary air and yarn inlet tube draws ambient air and the cut end of the yarn into the secondary air and yarn inlet tube causing the yarn to be carried therethrough. In some cases a loop of yarn will be drawn into the secondary air and yarn inlet tube depending on how far downstream of the device the operator cut the yarn. At the end of the time period $t_2$ shown by line 70, the leading or cut end of yarn has advanced to a point just beyond the end of the secondary air and yarn inlet tube to a point where it can be acted upon by the higher velocity air entering through the annular space between the secondary air and yarn inlet tube and the outlet tube; yarn tension will start to increase as seen in the portion of the curve beyond line 70, then as the leading end of the yarn moves more deeply into the outlet tube the air exerts progressively more tension on the yarn as depicted by the rising curve 62 in the time interval $t_3$. At the end of the time interval $t_3$ when the leading end of the yarn has traveled the full length of the outlet tube, the yarn will be running at a tension $X_1$ which tension is lower than the maximum ($X_2$) since at this stage the device remains set at the maximum suction condition. When the operator observes or comprehends that he has successfully introduced the yarn into the device (which latter may not always occur on the first attempt) he acts to cause the device to shift from the maximum suction condition to the maximum air velocity or yarn tension condition. His comprehension time is shown as $t_4$ and may be in the order of a few tenths of a second to several seconds; he initiates the shift at the time indicated by line 71 which shift is complete in the time interval $t_5$ terminating at line 72; in the period $t_5$, which is in the order of 100 milliseconds depending on the mechanical design of the device (i.e., size of piston, air pressure, friction, etc.), tension in the yarn line increases as shown by curve 62 until at time 72 tension reaches a new (or maximum) level $X_2$ which is markedly higher than $X_1$; thereafter, the operator manually transports the device and the high tension ($X_2$) running yarn line to a point where it is strung-up to the next processing element such as a windup device; at the time of such string-up depicted at line 73, yarn entering the yarn-handling device breaks or is manually cut whereupon tension reverts to the "process" tension X which originally prevailed and the operation is complete.

In the above described prior art device it will be recognized that the danger periods are those during which zero tension exists in the yarn line ($t_2$) or reduced tension exists in the yarn line ($t_3$ and $t_4$) for it is during these periods that the yarn line may become slack with the consequence that back-wraps or other malfunctions may occur on processing elements immediately upstream of the yarn-handling device. When only one of a plurality of yarn ends is being handled a reduction in tension to zero is particularly bad since even a slight wavering of that one yarn line is apt to result in a snarl and back-wrapping of all of the plurality of yarn ends.

Referring to FIGURE 5A, curve 60, it will be recalled that string-up of the yarn into the device of this invention is undertaken at the time indicated by line 64; the undisturbed yarn line is running through the opening or slot 56 and at that time (line 64) the operator depresses push button 22 which, in effect, causes the end of the push-rod 30 to move across the slot 56, engaging the running yarn, the end of the push-rod then moving into and through the bore of the yarn inlet tube 14. Transport of the running yarn into and all of the way through the yarn inlet tube occurs in the time interval $t_7$; during this period yarn tension is shown on curve 60 as being constant; however, depending on many factors, the tension may rise momentarily as shown by the broken line 60a or may fall as shown by broken line 60b; these factors include initial speed of yarn travel, initial tension X, friction between the yarn and any surface over which it now travels, the speed (or acceleration) of the push-rod 30, etc. In any case, the tip of the push-rod continues its travel through and beyond the downstream end of inlet tube 14; when the push-rod thrusts the yarn to a point at least an ⅛ inch beyond the downstream end of the inlet tube 14, and before the push-rod has started to decelerate, the knife blades 44 and 46 co-act to cut the yarn at a point below or downstream of the portion of the yarn in the inlet tube 14, the cut occurring at the time shown by line 75; in the succeeding and very short time interval $t_8$ tension in the yarn line upsteam of the device of this invention may drop abruptly to a new level $X_4$, but does not drop detrimentally by virtue of the exposure of a portion of the yarn to high velocity, agitated air. The portion of the yarn which is exposed to the high velocity agitated air just down stream of the annular orifice 52 is acted upon by that air such that, at the time indicated by line 76, yarn tension will begin to exceed the tension $X_4$ to which it had momentarily been subjected. Thereafter, in the fashion of the prior art devices, progressively greater tension is exerted on the yarn as depicted by the rising portion of the curve 60 in the time interval $t_9$ except, unlike the prior art devices, the tension instead of having to rise from zero, rises from a finite value $X_4$. The magnitude of the time interval $t_9$ is 10 to 15 milliseconds. At the end of the time interval $t_9$ when the leading end of the yarn has traveled the full length of the outlet tube 16, the yarn will be running at a tension $X_2$. The operator observes that string-up of the device has occurred and he proceeds to move the device and the yarn to the apparatus to be strung-up accomplishing this latter at the time shown by line 78 whereupon tension again reverts to the "process" tension X which prevailed at the outset and the operation is complete.

Throughout the foregoing discussion of yarn tensions and in the curves 60 and 62 the maximum tension of which either of the devices is assumed to be capable is shown by $X_2$ being depicted as less than the "process" tension X; this is not necessarily the case, for the maximum tension $X_2$ could be greater than or equal to the "process" tension X. In the case of the device of this invention the maximum tension $X_2$ could be substantially greater than the "process" tension and substantially greater than the maximum tension capability of the prior art devices by virtue of the turbulence produced by the tab element 20 and by virtue of the end of the push-rod extending into the air stream beyond the inner end of the yarn inlet tube.

An additional point of distinction between this invention and the prior art devices is that at the initial instant of entry of the leading end of the yarn into a high velocity fluid stream, the yarn is immediately exposed to a fluid moving at a velocity substantially greater than is the case with the prior art devices, preferably at the supersonic levels. This means that, as the fluid stream begins to act upon the yarn in this invention, the force on the yarn and consequently its tension will be greater.

It should be noted that both of the curves 60 and 62 are shown as discontinuous in the regions indicated by time intervals $t_4$ and $t_6$; the reason for this is that these time intervals are grossly greater (that is, out of scale) with respect to other time intervals shown in the curves such as, $t_1$, $t_2$, $t_3$, $t_5$, $t_7$, $t_8$, and $t_9$.

Referring to FIGURE 5A, curve 60, the tension $X_4$ occurring in the yarn at the instant at which it is cut is shown as being approximately one-half of the maximum tension $X_2$ of which the device is capable; this tension need not necessarily be one-half of $X_2$ but could range from 0.1 to 0.5 of $X_2$. The minimum yarn tension $X_4$ which occurs in the device of this invention is primarily a function of the extent (or length) of exposure of the yarn to the highly agitated fluid stream at the instant at which the yarn is cut; to a lesser degree the minimum tension that is reached is a function of the rate of feed-in of the yarn, the degree of restraint offered by the upstream yarn feed-in device as well as yarn-to-guide friction, windage, yarn denier, and number of filaments.

It has been determined that if the push-rod 30 is accelerated at a sufficient rate by spring 38 as compared with the yarn velocity and characteristics and when the outgoing yarn is being firmly pulled away by some means such as a windup, the action of the rod on the yarn is sufficient to cause it to be severed in the vicinity of the push-rod but in the outgoing portion of the yarn line and in such a manner that a specific yarn cutter or breaking device is not necessary.

Figure 10A:
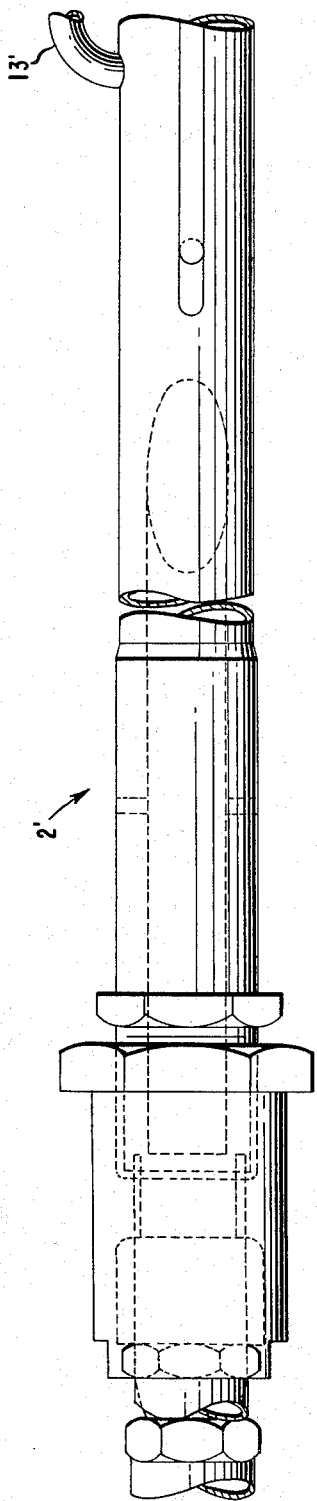
FIGURES 10A, 10B are a side elevational view of a modified version of the improved device of this invention with certain parts broken away.
Figure 10B:
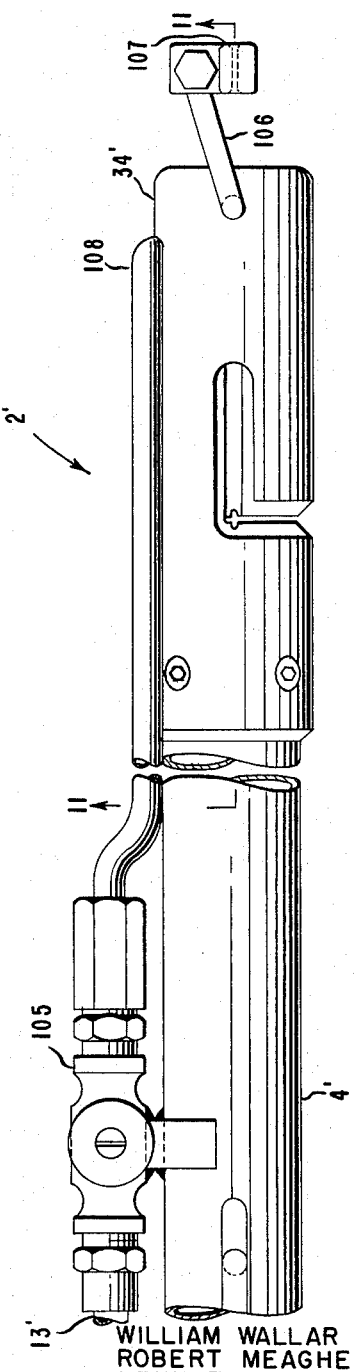
Figure 11:
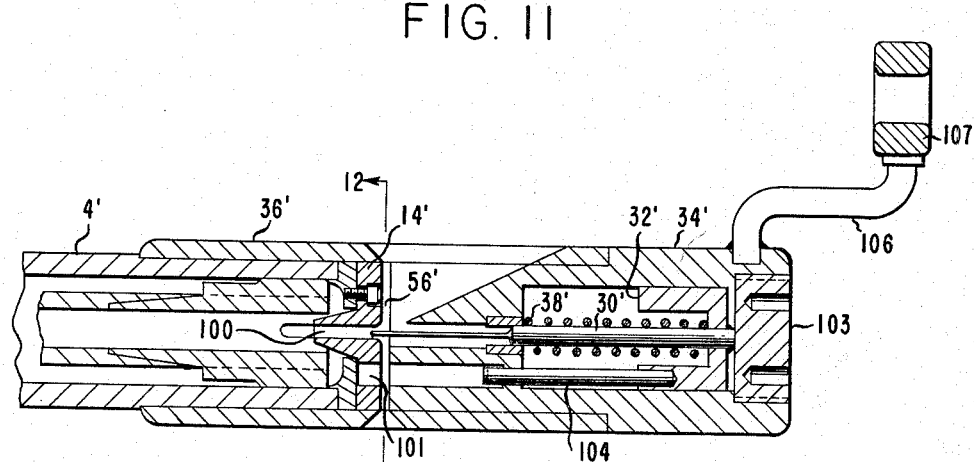
FIGURE 11 is a partial longitudinal cross-sectional view taken along line 11—11 of FIGURE 10B.
Figure 12:
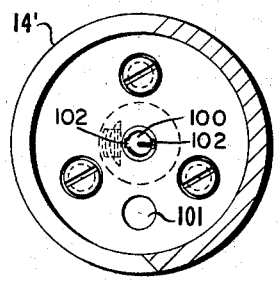
FIGURE 12 is a sectional view of the yarn inlet tube 14' taken along line 12–12 of FIGURE 11.

FIGURES 10–18 illustrate a modified version of a device embodying principles of this invention. Referring to FIGURE 11, the modified device is provided with a yarn inlet tube 14′ which has an integral flange having an outside diameter substantially equal to the inside diameter of the bushing 36′. This flange is pierced by a hole 101 which is parallel to the central bore 100 of the yarn inlet tube 14′. As will be seen in FIGURE 12, the bore 100 is provided with two axially extending slots or keyways 102 in diametrically opposed positions. The housing 34′, as shown in FIGURE 11, is provided with a bore in which is situated a piston 32′. A push-rod 30′ is axially aligned with and secured to piston 32′ and extends through a guide bushing in the center of the housing 34′. A flattened tang on the end of push-rod 30′ extends a short distance into the bore 100 of the inlet tube 14′ so that the edges of the flattened tang engage and are guided by keyways 102.

Figure 13:
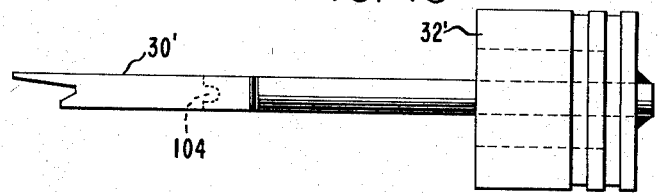
FIGURE 13 is a plan view of the push-rod assembly of the device of FIGURE 11.
Figure 14:
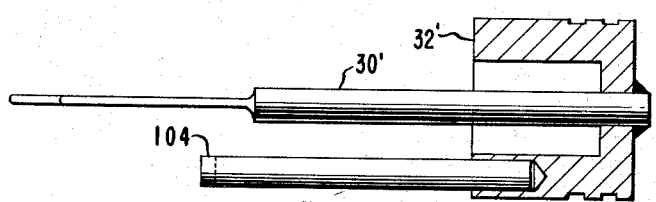
FIGURE 14 is a side elevational view of the push-rod assembly of FIGURE 13.

Surrounding the push-rod 30′ is a spring 38′ which urges the piston 32′ and the push-rod 30′ to the right, or away from the inlet tube 14′; the right hand end of the push-rod 30′, as shown in FIGURE 11, abuts the plug 103 in the housing 34′, the plug being located as to prevent the tang of the push-rod 30′ from being withdrawn completely from bore 100. Secured to the skirt of the piston 32′ is a pin 104 which is parallel to the push-rod 30′; the pin 104 is guided by engagement with a hole in the housing 34′ to prevent the piston 32′ and the push-rod 30′ from rotating. The pin 104 is axially aligned with the hole 101 in the flange of the inlet tube 14′. As shown in FIGURE 13 the end of pin 104 is provided with a shallow semi-circular slot.

In the device shown in FIGURE 10, a spring-loaded, normally closed valve 105 is mounted on the side of the air inlet tube 4′. One side of the valve is open to the interior of the inlet tube 4′, thus receiving pressurized air, and the other side (or downstream side) of the valve is connected to a conduit tube 13′ which is connected to the housing 34 in such a fashion that pressurized air may be admitted through hole 108 (FIGURES 10 and 15) to the space between the head of piston 32′ and the plug 103. When the handle of valve 105 is manually depressed, pressurized air will drive the piston 32′ and the push-rod 30′ to the left as seen in FIGURE 15, compressing spring 38.

The end of housing 34′ is provided with a metal bracket 106 on which is mounted a generally toroidal yarn guide 107; the guide is slotted (not shown) so that a running yarn line may be engaged by suitable manual manipulation of the yarn handling device.

In operation, the modified yarn handling device 2′ is brought into engagement with a running yarn line so that the yarn passes through the opening 56′. At this stage the operator depresses the handle of valve 105 causing the piston 32′ and push-rod 30′ to be driven to the left as seen in FIGURE 11. The piston 32′ bottoms in the bore of housing 34′ in such a position that the bifurcated end of the push-rod 30′ passes through and beyond the end of the yarn inlet tube 14′ while, simultaneously, the end of the pin 104 enters the hole 101 but does not bottom therein. As the push-rod 30′ and the pin thus move to the left the yarn running through the opening 56′ will be engaged first by the bifurcated end of the push-rod 30′ and secondly by the shallow semi-circular slot in the end of the pin 104; at the terminal position of the push-rod and pin the yarn line is disposed as shown in FIGURE 15. Since the yarn downstream of the yarn handling device 2′ is being withdrawn by a windup or like device (not shown), a rapid tension build-up occurs in the yarn partly as a result of extension (stretching) of the yarn arising from high velocity movement of the push-rod and partly by virtue of yarn contact on additional surfaces thus causing the yarn to make many approximately 90° and 180° turns with a concomitant increase in friction; this tension, of course, arises from the fact that the yarn is being withdrawn primarily by a downstream transporting means. In a very short period of time the tension reaches a level where the yarn breaks downstream of the push rod, whereupon the portion of the yarn upstream of the break is propelled into the yarn handling device 2′ by virtue of the exposure of a part of the yarn to high velocity air just beyond the end of the yarn inlet tube 14′. At some later stage the operator releases the handle of the valve 105, thus removing the air supply to the piston 32′; air leakage past the piston 32′ relieves the pressure thus permitting piston 32′ and push-rod 30′ to be returned to their starting positions under the urging of spring 38′. At this stage or preferably before the valve 105 is released, the running yarn is now manually deflected into the hole in the guide 107, taking the position shown in FIGURE 16. The purpose of guide 107 is to permit the operator to "reach" into a crowded region of an apparatus (e.g., into a windup apparatus and behind a bobbin) to effect a string-up operation. After such string-up has been accomplished, the operator cuts or breaks the running yarn downstream of the apparatus which has been strung up, and operations are completed.

In some instances it has been found desirable to use the modified push-rod 30′, shown in FIGURE 17, which is provided with a flat portion 109 or a relief on the top portion of the cylindrical part of the push-rod 30′. The purpose of this flat portion 109 is to provide greater space for entry of yarn into the inlet tube 14′ during the period when the push-rod extends into the bore 100. When this type push-rod is used it is possible for yarn having slubs, tangles, or broken filaments to enter the bore without snagging.

As noted above, the edges of the tang or flat part of the push-rod 30′ are adapted to engage the keyways 102 in the bore 100. The purpose of this is to help prevent yarn looped about the bifurcated end of the push-rod from slipping off of that end and slipping back along the push-rod out of the influence of the high velocity fluid stream just beyond inlet tube 14′.

It will be clear that novel and improved yarn-handling apparatus has been provided, one which is capable of not only maintaining yarn tension levels above those attainable by conventional devices, but which also very rapidly engages and picks up a running yarn line with a very rapid action while effectively minimizing drops in the yarn line tenison. The improved action of the new apparatus provides substantial benefits in the production of commercial yarns.

This application is a continuaion-in-part of our copending application Serial No. 76,805, filed December 19, 1960, now abandoned.

While a preferred embodiment of the improved device has been described in detail in accordance with the patent statutes, modifications will occur to those skilled in the art. Accordingly, the invention is intended to be limited only by the scope of the following claims.

We claim:

1. An improved yarn-handling device comprising in combination an air inlet tube, an air and yarn outlet tube, a passageway connecting the inlet and air and yarn outlet tubes, the outlet tube provided between its ends with an elongated section of substantially constant cross-sectional area, a yarn inlet tube mounted in cooperative association with the inlet end of said outlet tube to form an annular orifice, the outlet end of said yarn inlet tube and the inlet end of said outlet tube so constructed and arranged to form a converging-diverging nozzle arrangement, a conduit member connecting the air inlet tube to a source of high pressure air, the converging-diverging nozzle arrangement, the elongated section of the outlet tube, and the pressure of the high pressure air cooperating to establish and maintain substantially undiminished high velocity air flow conditions in the nozzle arrangement and along the said section in order to apply a high tension to a yarn line passing therethrough, a guide means positioned adjacent the inlet end of said yarn inlet tube for guiding and positioning a running yarn line in the vicinity of said yarn inlet tube inlet end, and a yarn line manipulating unit positioned in cooperative association with said guide means, said unit including movable parts for rapidly engaging the yarn line passing through the guide means, for moving a portion of the yarn line into and beyond the annular orifice to a point where the moving air stream exerts a strong tension on the yarn, and for causing the yarn line to be severed.

2. The improved device of claim 1 which further comprises a turbulence generating element projecting into said orifice, said element provided with an effective cross-sectional area of very small magnitude with respect to the cross section of said orifice in order to create a zone of increased turbulence and improve the tension level in yarn line passing through the device.

3. The improved device of claim 2 in which said section of the outlet tube is provided with a very gradually increasing inner diameter defined by side walls which are slightly diverging conical surface in the direction of the air flow and which have an included angle of from about fifteen to forty-five minutes in order to maintain the air flow substantially undiminished in said section and provide a very gradual pressure drop along its length.

4. The improved device of claim 1 in which said parts comprise a yarn line engaging rod element movable between a retracted position and a position in which it extends through said orifice and a rapidly accelerating means cooperating with said rod element for moving it between said two positions, and wherein is provided means on said device for actuating the accelerating means.

5. The improved device of claim 4 in which said unit also includes a separate yarn line cutting means actuated by said rapidly accelerating means to sever said yarn line passing through said guide means upon movement of said rod element to said position in which it extends through said orifice.

6. The improved device of claim 4 which comprises means for axially guiding said rod element during its movement between said two positions and restraining said rod element against rotation.

7. The improved device of claim 4 in which said unit also includes a separate yarn line severing means actuated by said rapidly accelerating means to frictionally snub and thereby break the yarn line passing through said guide means upon movement of said rod element to said position in which it extends through said orifice.

References Cited in the file of this patent
UNITED STATES PATENTS

| | | |
|---|---|---|
| 2,217,766 | Neff | Oct. 15, 1940 |
| 2,607,418 | Hebeler | Aug. 19, 1952 |
| 2,667,964 | Miller | Feb. 2, 1954 |